(12) United States Patent
Iida et al.

(10) Patent No.: US 11,131,246 B2
(45) Date of Patent: Sep. 28, 2021

(54) GAS TURBINE

(71) Applicant: MITSUBISHI HEAVY INDUSTRIES, LTD., Tokyo (JP)

(72) Inventors: Koichiro Iida, Tokyo (JP); Yoshiyuki Okabe, Tokyo (JP); Yoshiko Oya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/384,278

(22) Filed: Apr. 15, 2019

(65) Prior Publication Data

US 2019/0331026 A1 Oct. 31, 2019

(30) Foreign Application Priority Data

Apr. 27, 2018 (JP) .............................. JP2018-087475

(51) Int. Cl.
*F01D 11/04* (2006.01)
*F02C 7/28* (2006.01)
*F01D 11/00* (2006.01)

(52) U.S. Cl.
CPC .............. *F02C 7/28* (2013.01); *F01D 11/001* (2013.01); *F05D 2220/32* (2013.01); *F05D 2240/24* (2013.01); *F05D 2240/55* (2013.01)

(58) Field of Classification Search
CPC ............................... F01D 9/065; F01D 11/001
See application file for complete search history.

(56) References Cited

U.S. PATENT DOCUMENTS

| 3,945,758 A | * | 3/1976 | Lee | .......................... F01D 25/12 415/144 |
| 6,217,279 B1 | * | 4/2001 | Ai | .......................... F01D 11/001 415/110 |

(Continued)

FOREIGN PATENT DOCUMENTS

| JP | 8-338537 | 12/1996 |
| JP | 10-184312 | 7/1998 |

(Continued)

OTHER PUBLICATIONS

Eric M. Curtis et al., "Controlling Tip Leakage Flow Over A Shrouded Turbine Rotor Using An Air-Curtain", Proceedings of ASME Turbo Expo 2009: Power for Land, Sea and Air, GT2009, Orlando, Florida, USA, Jun. 8-12, 2009.

*Primary Examiner* — Justin D Seabe
(74) *Attorney, Agent, or Firm* — Wenderoth, Lind & Ponack, L.L.P.

(57) ABSTRACT

A gas turbine includes a rotor that has a rotor disk at each of a plurality of stages and a plurality of blades fixed to the respective stages, a casing, a plurality of vanes fixed to the casing, and an annular member fixed to a radially inner side of each of the vanes. The rotor disk has a seal arm. The annular member has an outer opposing portion that is radially opposed to the seal arm. The gas turbine further includes a seal fin that protrudes from the outer opposing portion toward the seal arm, a first cavity that is defined in the annular member and extends in a circumferential direction to straddle at least two of the vanes, a second cavity that is on a radially inner side of the first cavity, and a plurality of compressed air discharge paths that connect the first cavity to the second cavity.

6 Claims, 8 Drawing Sheets

(56) References Cited

U.S. PATENT DOCUMENTS

| | | | |
|---|---|---|---|
| 9,631,515 B2* | 4/2017 | Oyarbide | F01D 25/12 |
| 10,060,280 B2* | 8/2018 | Crawley, Jr. | F01D 11/001 |
| 10,577,966 B2* | 3/2020 | Subramanian | F01D 9/041 |
| 2009/0297341 A1 | 12/2009 | Turnquist et al. | |
| 2014/0037435 A1 | 2/2014 | Porter et al. | |

FOREIGN PATENT DOCUMENTS

| | | |
|---|---|---|
| JP | 11-22412 | 1/1999 |
| JP | 2009-293617 | 12/2009 |
| JP | 6204984 | 9/2017 |

* cited by examiner

GAS TURBINE

CROSS-REFERENCE TO RELATED APPLICATION

Priority is claimed from Japanese Patent Application No. 2018-087475 filed on Apr. 27, 2018, the content of which is incorporated herein by reference.

BACKGROUND OF THE INVENTION

Field of the Invention

The present invention relates to a gas turbine.

Description of Related Art

A gas turbine has a problem in which a high-temperature combustion gas flowing in a combustion gas flow passage leaks into a gap between a turbine vane and a rotor, and thereby a metal temperature of a seal ring holder ring or a seal device, which is fixed to a radially inner side of the vane, rises. By the metal temperature of the seal ring holder ring or the seal device rising, a problem, in which a gap on a rotor side expands due to thermal expansion and the expansion leads to a decrease in a sealing performance, arises.

For example, a gas turbine that supplies seal air having a temperature lower than a combustion gas to a radially inner side of a vane in order to prevent the combustion gas from leaking into a gap between a turbine vane and a rotor, and in order to suppress a temperature rise when the combustion gas leaks in is disclosed in Japanese Unexamined Patent Application, First Publication No. H11-22412.

SUMMARY OF THE INVENTION

However, it is necessary to uniformly jet out the supplied seal air in a circumferential direction in order to improve a sealing performance. In Japanese Unexamined Patent Application, First Publication No. H11-22412, a structure of supplying the seal air from a plurality of holes is adopted. Thus, a problem in terms of the uniformity of the seal air in the circumferential direction remains.

An object of the invention is to provide a gas turbine that can effectively suppress a combustion gas leaking into a gap between a vane and a rotor.

According to a first aspect of the present invention, there is provided a gas turbine including a rotor that rotates around an axis, the rotor having a rotor disk stacked at each of a plurality of stages in an axial direction and a plurality of blades fixed to the respective stages of the rotor disks, a casing that covers the rotor rotatable, a plurality of vanes fixed to the casing to correspond to the plurality of blades at the respective stages, an inner shroud provided on a radially inner side of each of the vanes, and an annular member fixed to the radially inner side of each of the inner shrouds. The rotor disk has a seal arm that protrudes to a downstream side of the axial direction of the rotor disk. The annular member has an outer opposing portion that is disposed radially outward of the seal arm and radially opposed to the seal arm. The gas turbine further includes a seal fin that protrudes from an inner circumferential surface of the outer opposing portion of the annular member toward an outer circumferential surface of the seal arm, extends in a circumferential direction, and forms a tapered shape of which a diameter decreases as going toward an upstream side of the axial direction, a first cavity that is formed by being surrounded by the annular member and the inner shroud and extends in the circumferential direction to straddle at least two vanes out of the plurality of vanes, a second cavity that is provided on a radially outer side of the seal fin and on the radially inner side of the first cavity, communicates and extends in the circumferential direction, and is open to the radially inner side, a compressed air supply path through which compressed air is introduced into the first cavity, and a plurality of compressed air discharge paths that are provided at an interval in the circumferential direction and connect the first cavity to the second cavity.

In such a configuration, since the compressed air is jetted out along the seal fin, the compressed air is jetted out so as to oppose a combustion gas leaked in gaps between the vanes and the rotor. Thus, the inflow of the combustion gas can be effectively suppressed.

In addition, by the first cavity inside the annular member extending in the circumferential direction and the second cavity being formed to extend in the circumferential direction, the uniformity of the jetted compressed air in the circumferential direction increases. Thus a function as an air curtain can be improved.

In the gas turbine, an angle formed between the seal fin and the axis may be 50° or less.

In such a configuration, the combustion gas that tries to pass a small gap between a tip portion of the seal fin and the seal arm can be pushed back to an upstream side while an effect of reducing the flow can be improved.

In the gas turbine, a concave portion formed on the radially inner side of the annular member and a guide plate that is connected to the downstream side of the axial direction of the seal fin, extends in the circumferential direction, wherein the second cavity is formed between the concave portion and the guide plate may be further included.

In such a configuration, by sealing at least one compressed air discharge path, out of the plurality of compressed air discharge paths, the flow rate of the compressed air that flows from the first cavity into the second cavity can be adjusted.

In the gas turbine, a surface of the second cavity, which opposes the seal fin, may be parallel to the seal fin.

In such a configuration, the uniformity of the jetted compressed air in the circumferential direction can be further improved.

In the gas turbine, an upstream seal fin that protrudes from the inner circumferential surface of the outer opposing portion of the annular member toward the outer circumferential surface of the seal arm, extends in the circumferential direction, and opposes the seal fin via the second cavity may be further included.

In such a configuration, the uniformity of the compressed air functioning as an air curtain in the circumferential direction can be further increased.

In the present invention, since the compressed air is jetted out along the seal fin, the compressed air is jetted out so as to oppose the combustion gas leaked in the gaps between the vanes and the rotor. Thus, the inflow of the combustion gas can be effectively suppressed.

In addition, by the first cavity inside the annular member extending in the circumferential direction and the second cavity being formed to extend in the circumferential direction, the uniformity of the jetted compressed air in the circumferential direction increases. Thus a function as an air curtain can be improved.

DETAILED DESCRIPTION OF THE INVENTION

First Embodiment

Hereinafter, a first embodiment of a gas turbine according to the present invention will be described in detail with reference to the drawings.

Figure 1:
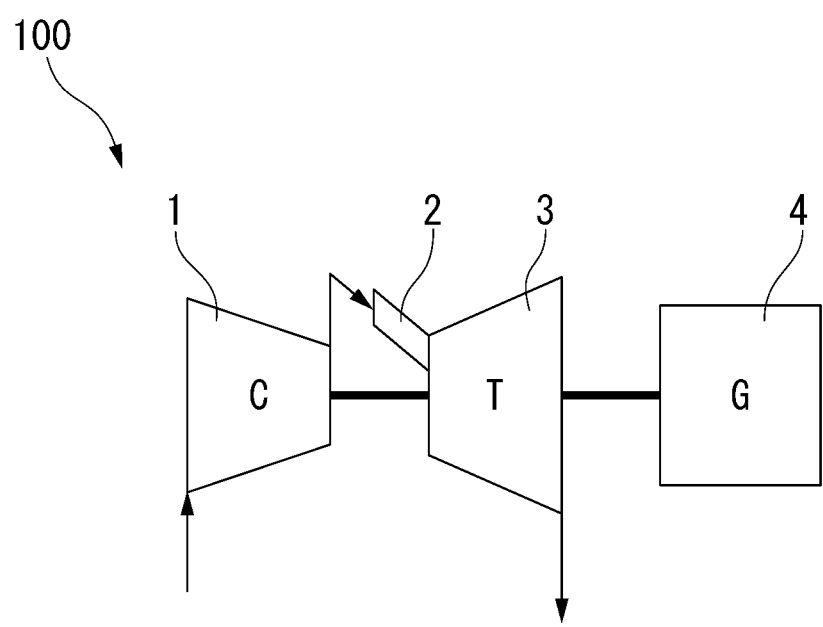
FIG. 1 is a schematic view showing a configuration of a gas turbine according to a first embodiment of the present invention.

As shown in FIG. 1, a gas turbine 100 of the embodiment includes a compressor 1 that compresses outside air to generate compressed air, a plurality of combustors 2 that mix fuel supplied from a fuel supply source (not shown) with the compressed air and combust the mixture to generate a combustion gas, and a turbine 3 that is driven by the combustion gas.

Figure 2:
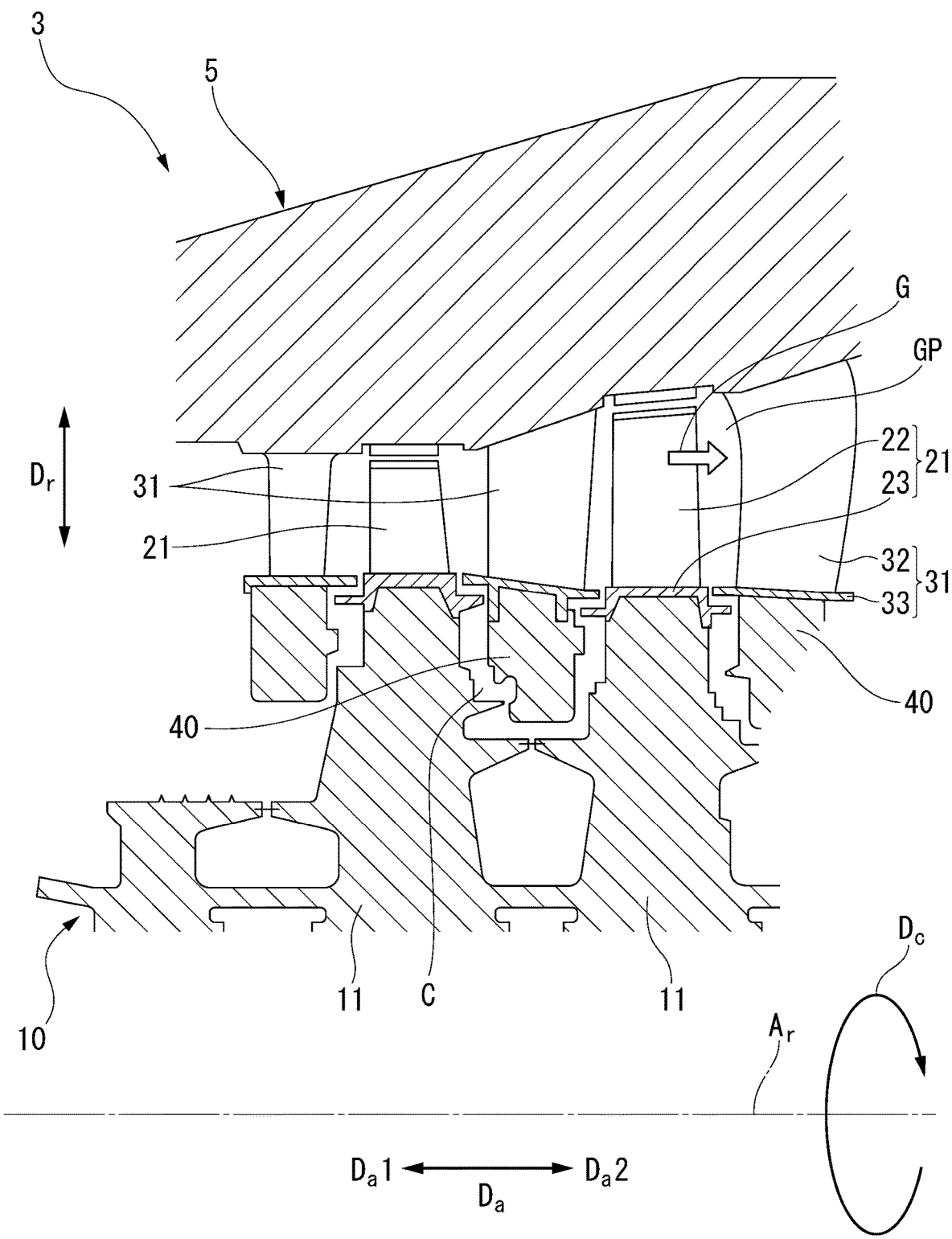
FIG. 2 is a sectional view of main portions of the gas turbine according to the first embodiment of the present invention.

As shown in FIG. 2, the turbine 3 includes a rotor 10 that rotates about an axis Ar and a casing 5 that rotatably covers the rotor 10. For example, a generator 4 (refer to FIG. 1) that generates electricity with the rotation of the rotor 10 is connected to the rotor 10. Hereinafter, a direction where the axis Ar of the rotor 10 extends will be referred to as an axial direction Da. In a radial direction Dr of the axis Ar, a side of approaching the axis Ar will be referred to as a radially inner side, and a side of moving away from the axis Ar will be referred to as a radially outer side.

The rotor 10 has rotor disks 11 stacked at a plurality of stages in the axial direction Da and a plurality of blades 21 which are fixed to respective stages of the rotor disks 11 and are arranged in a circumferential direction Dc of the axis Ar. In an inner circumference of the casing 5, a plurality of vanes 31 are fixed to correspond to the plurality of blades 21 at respective stages. The plurality of vanes 31 at respective stages are arranged side by side in the circumferential direction Dc of the axis Ar.

A seal ring holder ring 40 (holding member) is fixed to the radially inner side of each of the plurality of vanes 31 at each stage.

Figure 3:
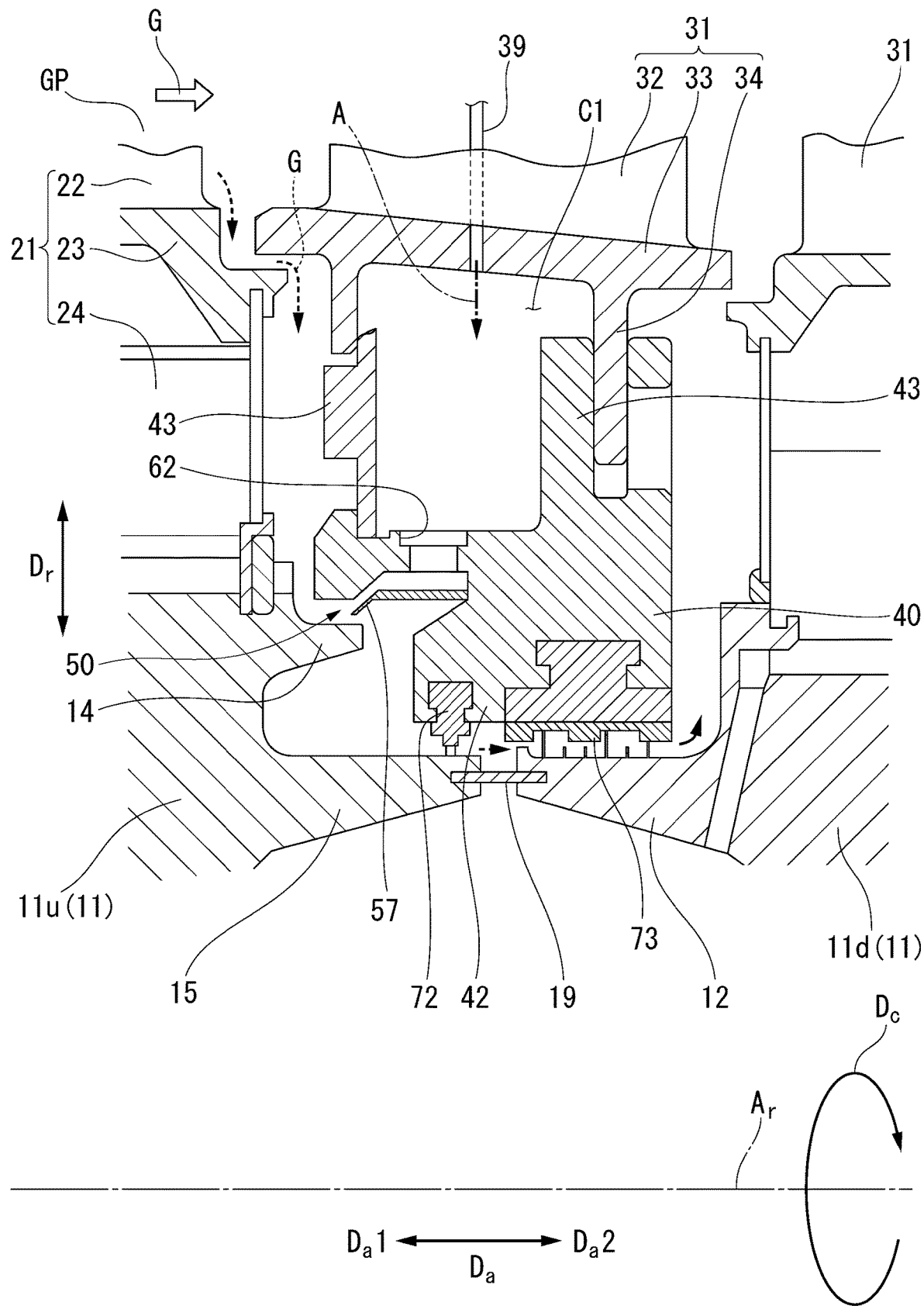
FIG. 3 is a detailed sectional view of a vicinity of a rotor disk and a seal ring holder ring of FIG. 2.

As shown in FIG. 3, an upstream rim portion 12, which protrudes to an upstream side Da1, and a seal arm 14 and a downstream side rim portion 15, which protrude to a downstream side Da2, are formed in the rotor disk 11 for each of the plurality of stages. The downstream side rim portion 15 of the rotor disk 11 is positioned on the radially inner side of the seal arm 14, and opposes the upstream rim portion 12 of a downstream rotor disk 11d, which is the rotor disk 11 adjacent to the downstream side Da2.

An air baffle 19 is provided between the downstream side rim portion 15 of an upstream the rotor disk 11u and the upstream rim portion 12 of the downstream rotor disk 11d.

The blades 21 fixed to the rotor disks 11 each have a blade main body 22 extending in the radial direction Dr, a platform 23 provided on the radially inner side of the blade main body 22, a shank 24 provided on the radially inner side of the platform 23, and a vane root (not shown) provided on the radially inner side of the shank 24. The blades 21 are fixed to the rotor disks 11 by the vane roots of the blades 21 being inserted into the rotor disks 11.

The vanes 31 fixed to the casing 5 each have a vane main body 32 extending from an inner circumferential surface of the casing 5 to the radially inner side, an inner shroud 33 provided on the radially inner side of the vane main body 32, and a pair of leg portions 34 extending from the inner shroud 33 to the radially inner side.

A first cavity C1 extending in the circumferential direction Dc is formed by the inner shroud 33 and the seal ring holder ring 40. The first cavity C1 is formed to straddle at least two vanes 31.

For the sake of cooling the vanes 31, a compressed air supply path 39, through which some of compressed air A (cooling gas) extracted from a middle of the compressor 1 (refer to FIG. 1) is supplied to the inner shroud 33, is disposed in the vane main body 32 to penetrate the vane main body 32 in the radial direction Dr. An end portion of the compressed air supply path 39 is open to the first cavity C1.

As shown in FIG. 2, a space surrounded by a radially outer surface of the inner shroud 33 of the vane 31, a radially outer surface of the platform 23 of the blade 21, and the inner circumferential surface of the casing 5 is a combustion gas flow passage GP in which a combustion gas G from the combustors 2 flows.

Figure 4:
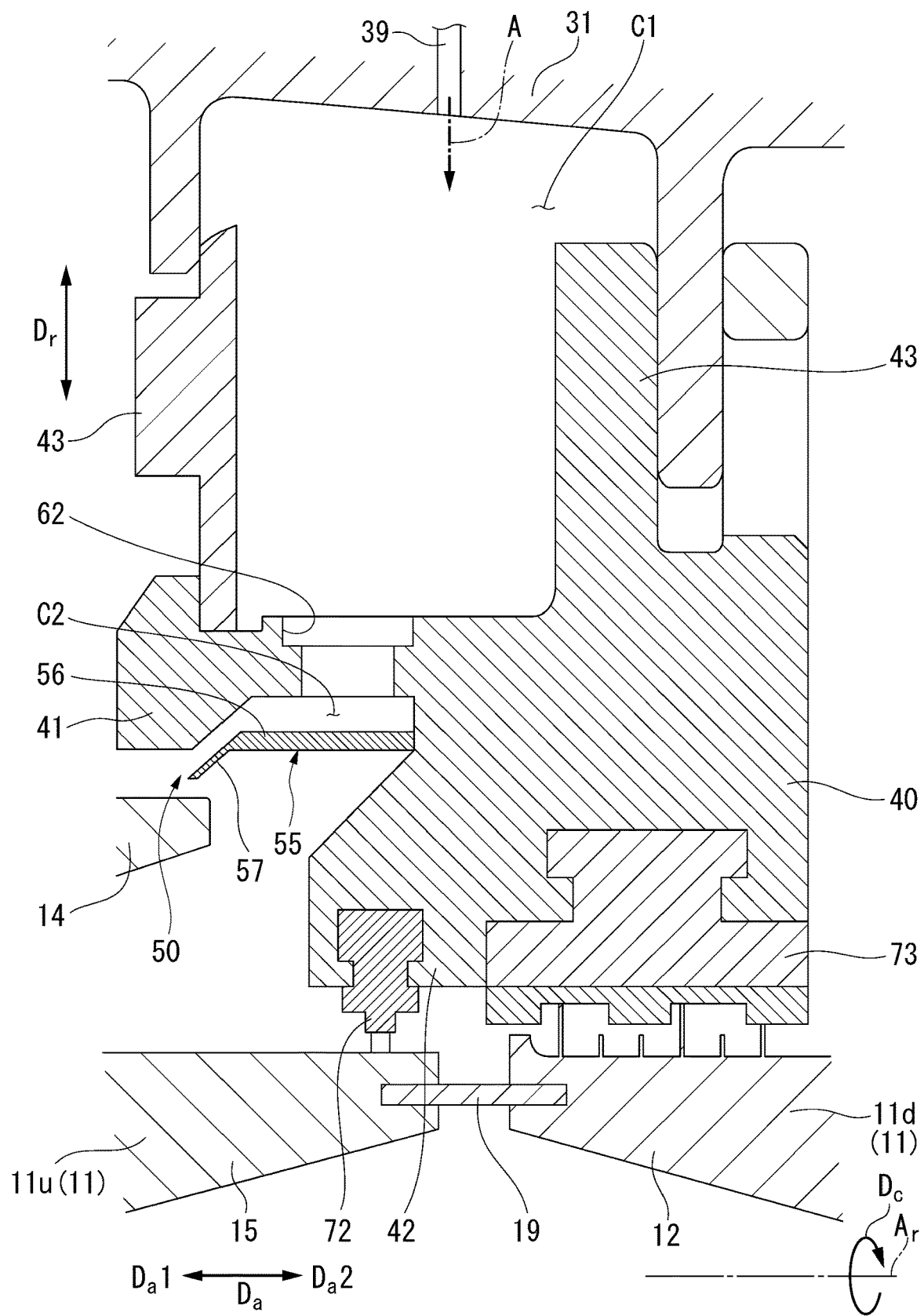
FIG. 4 is a detailed sectional view of the vicinity of the seal ring holder ring of FIG. 3.

As shown in FIG. 4, an outer opposing portion 41 that opposes the seal arm 14 of the upstream the rotor disk 11u in the radial direction Dr is formed on the radially inner side of the seal ring holder ring 40.

An inner opposing portion 42 that opposes the downstream side rim portion 15 of the upstream the rotor disk 11u and the upstream rim portion 12 of the downstream rotor disk 11d in the radial direction Dr is formed on the radially inner side of the seal ring holder ring 40. The outer opposing portion 41 is formed on the upstream side Da1 and at a radially outer position with the inner opposing portion 42 as reference.

The turbine 3 includes a seal device 50 that seals between the outer opposing portion 41 of the seal ring holder ring 40 and the seal arm 14.

A leaf seal 72 that seals between the inner opposing portion 42 and the downstream side rim portion 15 of the upstream the rotor disk 11u, which opposes the inner opposing portion in the radial direction Dr, is provided on the upstream side Da1 of the inner opposing portion 42 of the seal ring holder ring 40.

A labyrinth seal 73 that seals between the inner opposing portion 42 and the upstream rim portion 12 of the downstream rotor disk 11d, which opposes the inner opposing portion in the radial direction Dr, is provided on the downstream side Da2 of the inner opposing portion 42 of the seal ring holder ring 40.

The leaf seal 72 includes multiple thin sheet seal pieces and a holding portion that holds end portions of the multiple seal pieces. With a thickness direction of each thin sheet seal piece facing the circumferential direction Dc of a rotating body (the downstream side rim portion 15 of the rotor disk 11), the multiple thin sheet seal pieces are arranged around the rotating body while holding a small gap between each other in the circumferential direction Dc. A radially inner end portion of each thin sheet seal piece is a free end, and a radially outer end portion thereof is held by the holding portion. Each thin sheet seal piece is inclined and disposed such that the radially inner free end is positioned closer to a rotation direction side of the rotating body than the radially outer fixed end portion is.

In the leaf seal 72, when the rotating body is stationary, the free end of each thin sheet seal piece is in contact with the rotating body, and when the rotating body rotates, the free end of each thin sheet seal piece comes into a non-contact state since an outer circumferential surface of the rotating body rises due to the occurrence of a dynamic pressure effect caused by the rotation of the rotating body. For this reason, the leaf seal 72 has an extremely high sealing performance and has high durability.

Although the leaf seal 72 is adopted in the embodiment as a seal device that seals between the inner opposing portion 42 and the downstream side rim portion 15, it is possible to adopt, for example, a brush seal without being limited thereto.

The first cavity C1 is formed by being surrounded by at least the seal ring holder ring 40 and the inner shroud 33. In the embodiment, a connecting portion 43 connected to the leg portions 34 of the inner shroud 33 is provided on the radially outer side of the seal ring holder ring 40, and a part of the first cavity C1 is surrounded also by the connecting portion 43. The connecting portion 43 can also be formed as a component integrated with the seal ring holder ring 40.

Next, the seal device 50 provided in the outer opposing portion 41 of the seal ring holder ring 40 will be described.

Figure 5:
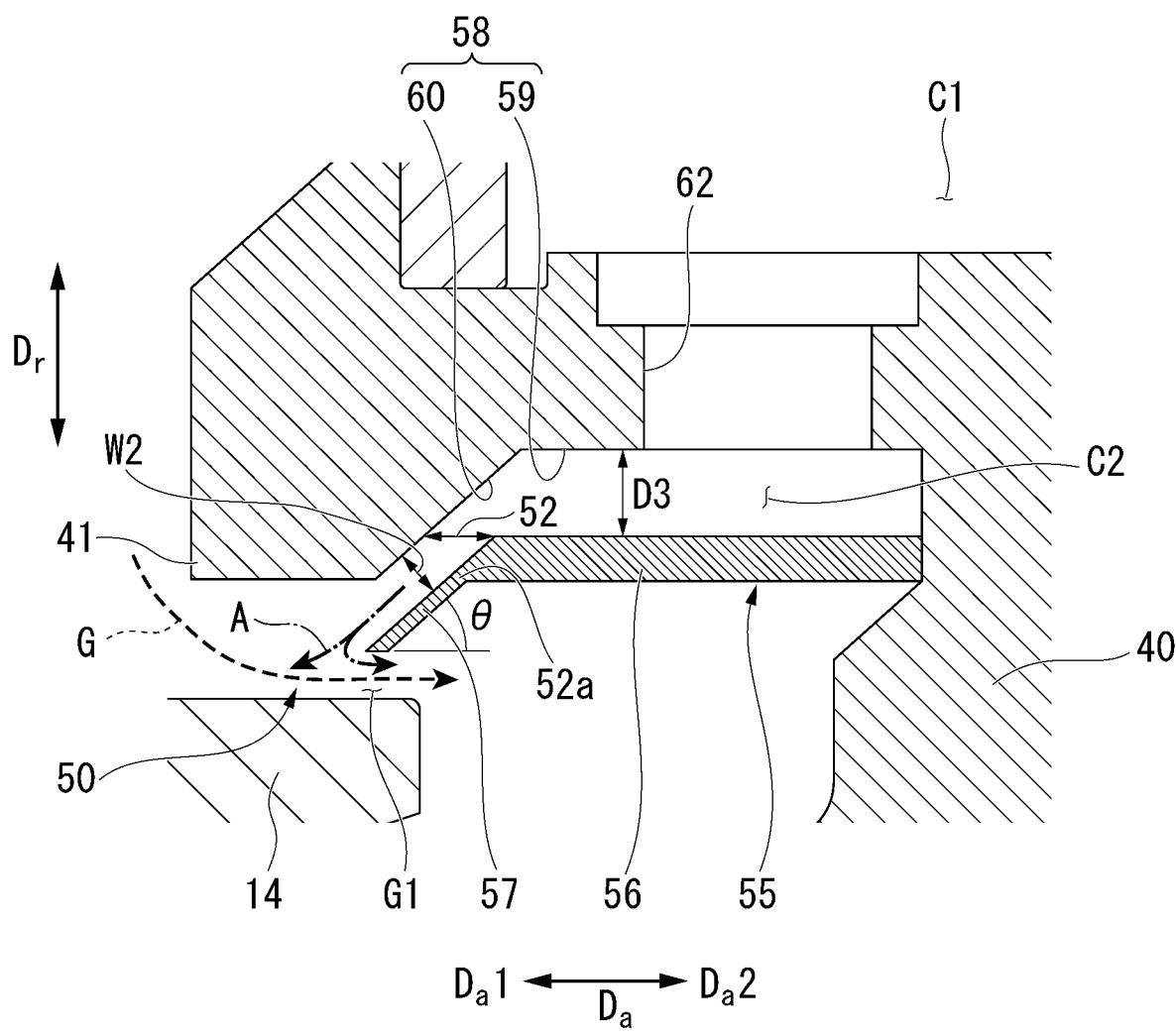
FIG. 5 is a detailed sectional view of a seal device of the first embodiment of the present invention.

As shown in FIG. 5, the seal device 50 includes a guide plate unit 55 integrated with a seal fin 57, a concave portion 58 that is formed on the radially inner side of the seal ring holder ring 40 and forms a second cavity C2 which communicates and extends in the circumferential direction Dc between the guide plate unit 55 and the concave portion, and a plurality of compressed air discharge paths 62 through which the compressed air A in the first cavity C1 is discharged to the second cavity C2 (the concave portion 58). The second cavity C2 is provided on an outer side of the seal fin 57 in the radial direction Dr.

The second cavity C2 formed by the concave portion 58 and the guide plate unit 55 is not completely covered by the guide plate unit 55, and has an opening 52. The compressed air A introduced in the second cavity C2 from the compressed air discharge paths 62 is jetted out from the opening 52 of the second cavity C2 along the seal fin 57.

The concave portion 58 has a main body portion 59 and a slit portion 60 that is formed on the upstream side Da1 of the main body portion 59 and approaches the outer opposing portion 41 as going toward the upstream side Da1. The concave portion 58 is formed such that an inner circumferential surface of the main body portion 59 is parallel to the axis Ar.

The guide plate unit 55 has a cylindrical guide plate 56 about the axis Ar and the seal fin 57 connected to an end portion of the guide plate 56 on the upstream side Da1 in the axial direction. The guide plate 56 forms the second cavity C2 between the concave portion 58 and the guide plate.

The guide plate 56 functions as the outer opposing portion 41. Inside the seal ring holder ring 40, the second cavity C2 is provided on the radially inner side of the first cavity C1 and has the opening 52 in an inner circumferential surface of the outer opposing portion 41. The compressed air discharge path 62 is connected to an outer side of the second cavity C2 in the radial direction Dr.

The seal fin 57 protrudes from a downstream end portion 52a of the opening 52 toward an outer circumferential surface of the seal arm 14.

The seal fin 57 is formed in a thin plate shape that extends toward an inner side in the radial direction Dr and extends in the circumferential direction. A small gap G1 is formed between a tip portion of the seal fin 57 and the seal arm 14 in the radial direction Dr.

The seal fin 57 extends in the circumferential direction and is formed in a tapered shape of which a diameter decreases as going toward the upstream side Da1. In other words, the seal fin 57 is inclined toward the upstream side Da1 as going toward the tip portion (the radially inner end portion). It is preferable that an angle θ formed between the seal fin 57 and the axis Ar be 48° or less. The angle θ can be changed as appropriate according to specification of the gas turbine 100. For example, the angle θ can be set to 50° or less.

The main body portion 59 of the concave portion 58 is formed to be parallel to the guide plate 56. The slit portion 60 of the concave portion 58 is formed such that an inner circumferential surface of the slit portion 60 is parallel to the seal fin 57 of the guide plate unit 55.

The inner circumferential surface of the slit portion 60, which is a surface of the second cavity C2 opposing the seal fin 57, is formed to be parallel to the seal fin 57. A portion between the inner circumferential surface of the slit portion 60 and the seal fin 57 functions as a slit which extends in the circumferential direction Dc and through which the compressed air A is discharged.

The plurality of compressed air discharge paths 62 are provided at intervals in the circumferential direction Dc. For example, the number of the compressed air discharge paths 62 can be approximately twice the number of the vanes 31. The compressed air discharge paths 62 can be sealed by using a cap (not shown).

When an interval between an inner circumferential surface 59a of the main body portion 59 of the concave portion 58 and an outer circumferential surface of the guide plate 56, that is, a size of the second cavity C2 in the radial direction Dr is set as D3, and an interval between the inner circumferential surface of the slit portion 60 of the concave portion 58 and an outer circumferential surface of the seal fin 57, that is, a width of the slit is set to W2, the concave portion 58 (the second cavity C2) and the guide plate unit 55 are formed to satisfy W2<D3.

Figure 6:
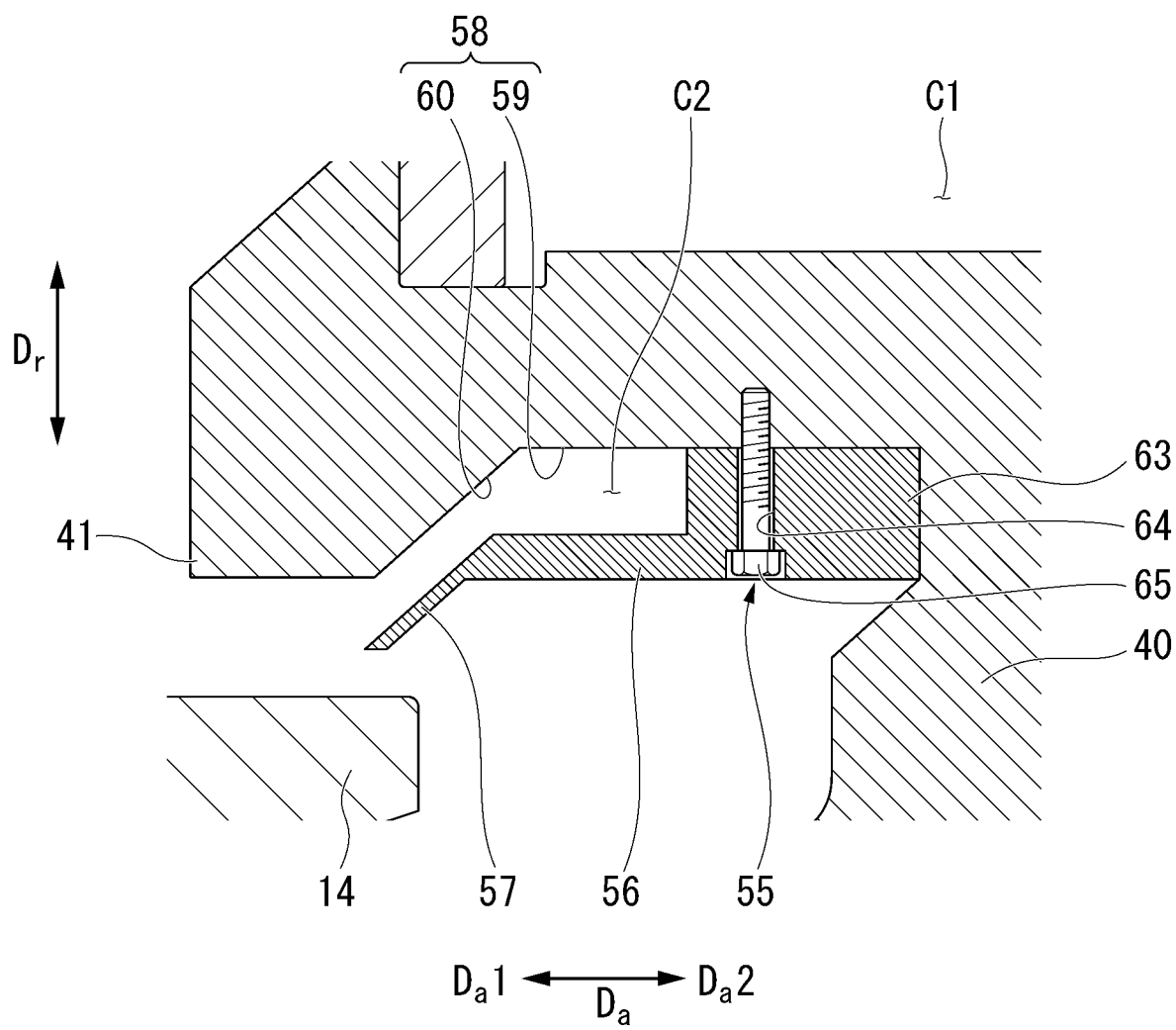
FIG. 6 is a detailed sectional view of the seal device of the first embodiment of the present invention.

As shown in FIG. 6, the guide plate unit 55 and the seal ring holder ring 40 are fixed to each other via a boss portion 63 formed in the guide plate unit 55. The plurality of boss portions 63 are formed in the outer circumferential surface of the guide plate 56 at intervals in the circumferential direction Dc. Each of the boss portions 63 is formed to protrude from the outer circumferential surface of the guide plate 56 to the radially outer side and to collide with the main body portion 59 of the concave portion 58.

The boss portions 63 and the compressed air discharge paths 62 are shifted away from each other in the circumferential direction Dc. That is, the boss portions 63 and the compressed air discharge paths 62 are disposed at different positions in the circumferential direction Dc such that the boss portions and the compressed air discharge paths do not interfere with each other.

A through-hole 64 into which a bolt is inserted is formed in each of the boss portions 63. The guide plate unit 55 is fixed to the seal ring holder ring 40 by a bolt 65.

Next, an effect of the gas turbine 100 of the embodiment will be described.

By passing the combustion gas flow passages GP and coming into contact with the blades 21 in the middle of passing, the high-temperature and high-pressure combustion gas G introduced from the combustors 2 rotates the rotor 10 having the blades 21 about the axis Ar.

In addition, the compressed air A (one-dot chain line) supplied to the compressed air supply path 39 provided in the vane 31 from an outer side of the casing 5 passes through the first cavity C1 and is discharged to the second cavity C2 via the compressed air discharge path 62. After being uniformized in the circumferential direction Dc in the second cavity C2, the compressed air A is jetted out as an air curtain between the seal ring holder ring 40 and the seal arm 14.

Some of the jetted compressed air A leaks to the upstream side Da1 and is discharged to the combustion gas flow passage GP. In addition, some of the jetted compressed air A leaks to the downstream side Da2 from the small gap G1 between the seal fin 57 and the seal arm 14, then leaks to the leaf seal 72 and the labyrinth seal 73, and is discharged to the combustion gas flow passage GP. Accordingly, the combustion gas G is prevented from leaking into gaps between the vanes 31 and the rotor 10.

In the embodiment, since the compressed air A is jetted out along the seal fin 57 forming a tapered shape of which the diameter decreases as going toward the upstream side Da1, the compressed air A is jetted out so as to oppose the combustion gas G leaked in the gaps between the vanes 31 and the rotor 10. Thus, the inflow of the combustion gas G can be effectively suppressed.

In addition, by the first cavity C1 inside the seal ring holder ring 40 extending in the circumferential direction Dc and the second cavity C2 being formed to extend in the circumferential direction Dc, the uniformity of the jetted compressed air A in the circumferential direction Dc increases, and thus a function as the air curtain can be improved.

In addition, by setting the angle θ formed between the seal fin 57 and the axis Ar to 50° or less, the combustion gas G that tries to pass the small gap G1 between the tip portion of the seal fin 57 and the seal arm can be pushed back to the upstream side Da1 while an effect of reducing the flow can be improved.

By sealing at least one compressed air discharge path 62, out of the plurality of compressed air discharge paths 62, the flow rate of the compressed air A that flows from the first cavity C1 into the second cavity C2 can be adjusted.

In addition, by forming the inner circumferential surface of the slit portion 60 of the concave portion 58 and the seal fin 57 to be parallel to each other, the uniformity of the jetted compressed air A in the circumferential direction Dc can be further improved.

Although the compressed air discharge paths 62 are through-holes in the embodiment, the compressed air discharge paths are not limited thereto. For example, the compressed air discharge paths 62 may be slits extending in the circumferential direction Dc.

Modified Example of First Embodiment

Figure 7:
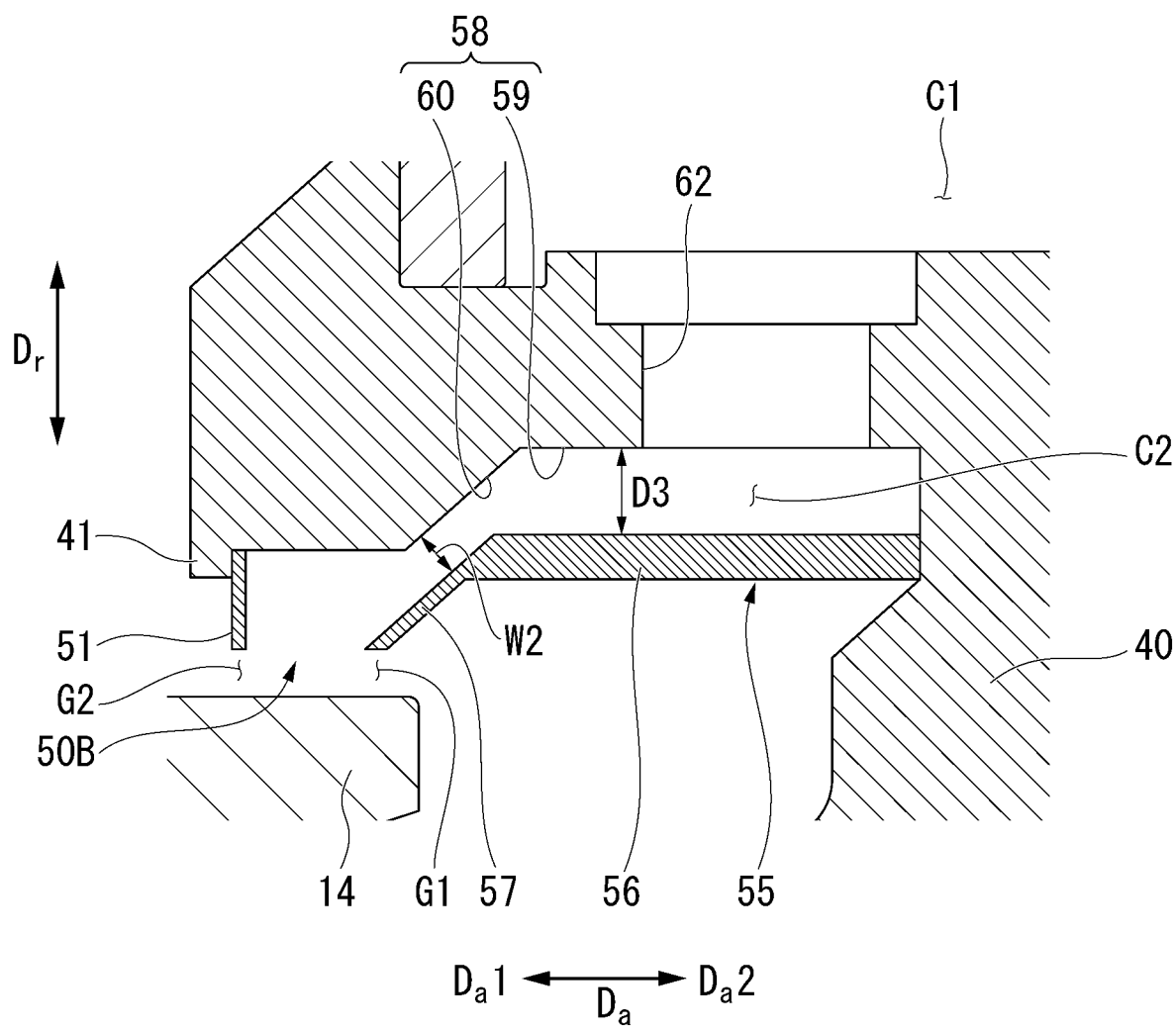
FIG. 7 is a detailed sectional view of a seal device of a modified example of the first embodiment of the present invention.

FIG. 7 is a sectional view of a seal device 50B of a modified example of the first embodiment. As shown in FIG. 7, the seal device 50B of the modified example of the first embodiment has an upstream seal fin 51 that is disposed on the upstream side Da1 of the seal fin 57 and seals between the seal arm 14 and the outer opposing portion 41 in the radial direction Dr.

The upstream seal fin 51 is formed in a thin plate shape that extends from the outer opposing portion 41 toward the radially inner side and extends in the circumferential direction. A small gap G2 is formed between a tip portion of the upstream seal fin 51 and the seal arm 14 in the radial direction Dr.

The small gap G2 between the upstream seal fin 51 and the seal arm 14 and the small gap G1 between the seal fin 57 and the seal arm 14 have the same dimension.

In the modified example, the uniformity of the compressed air A functioning as the air curtain in the circumferential direction Dc can be further increased.

Second Embodiment

Hereinafter, a gas turbine according to a second embodiment of the present invention will be described in detail with reference to the drawings. Differences from the modified example of the first embodiment described above will be mainly described and description of the same portions will be omitted in the embodiment.

Figure 8:
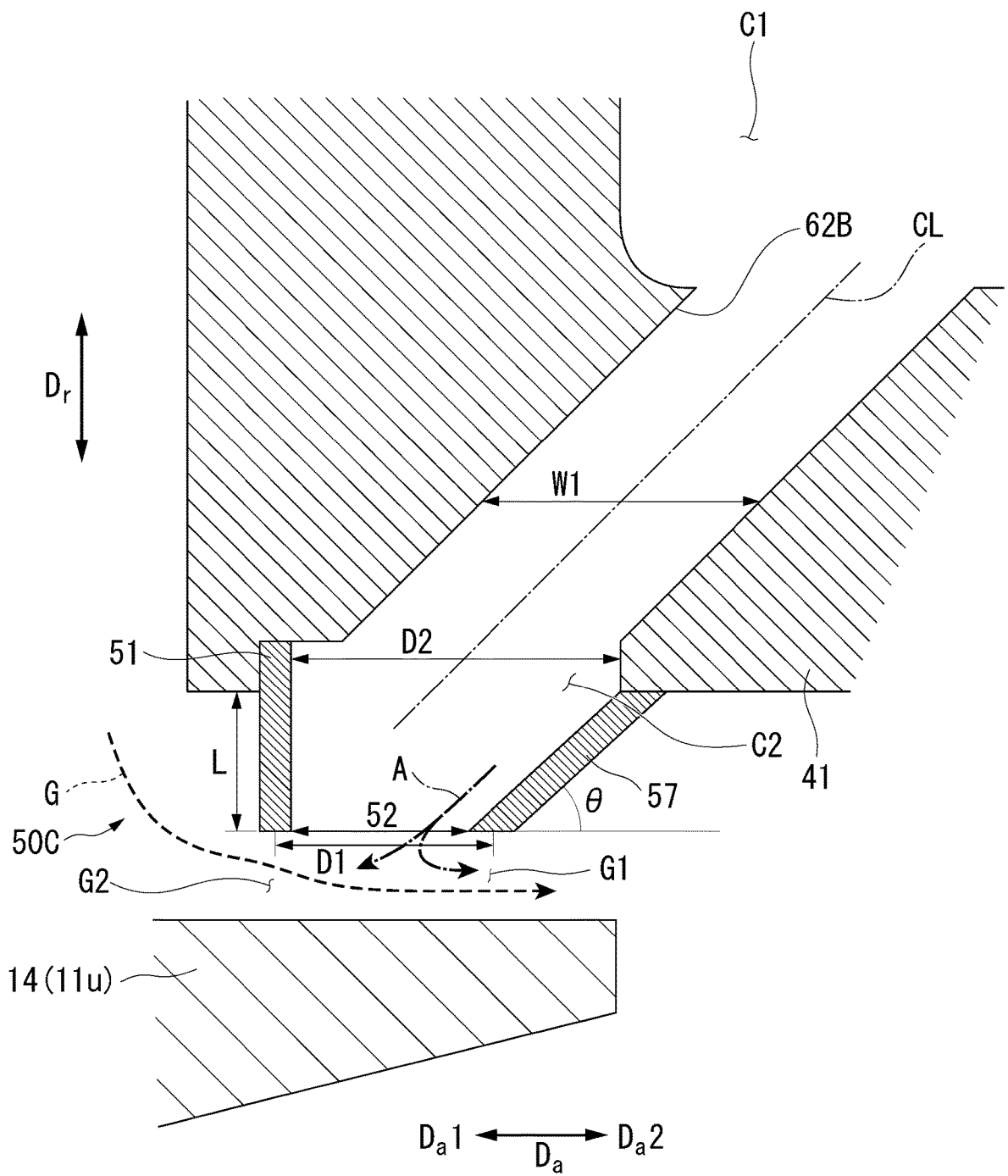
FIG. 8 is a detailed sectional view of a seal device of a second embodiment of the present invention.

As shown in FIG. 8, the upstream seal fin 51 of a seal device 50C opposes the seal fin 57 via the second cavity C2. The seal fin 57 is directly fixed to the outer opposing portion 41. A compressed air discharge path 62B is inclined to the upstream side Da1 as going from the first cavity C1 to the second cavity C2.

The small gap G2 between the upstream seal fin 51 and the seal arm 14 and the small gap G1 between the seal fin 57 and the seal arm 14 have the same length. When a length of the upstream seal fin 51 in the radial direction Dr is set as L and an interval between the upstream seal fin 51 and a tip of the seal fin 57 in the axial direction Da is set as D1, the upstream seal fin 51 and the seal fin 57 are disposed to satisfy the following expression (1).

$$0.2 < L/D1 < 10 \qquad (1)$$

A relational expression between a length L of the upstream seal fin 51 in the radial direction Dr, which is described above, and an interval D1 between the upstream seal fin 51 and the tip of the seal fin 57 in the axial direction Da can be also applied to the seal device 50B of the modified example of the first embodiment.

A width D2 of the second cavity C2 on the radially outer side in the axial direction Da is slightly larger than or is the same as a width W1 of the compressed air discharge path 62B in the axial direction Da.

An angle formed between a center line CL of the compressed air discharge path 62B and the axis Ar is substantially the same as the angle θ of the seal fin 57.

In the embodiment, a structure of the seal device can be simplified by eliminating the guide plate unit 55.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, although a configuration where the seal device 50 is provided in the seal ring holder ring 40 is adopted in the embodiments, without being limited thereto, the seal device may be provided in another annular member that connects radially inner end portions of the vanes 31 in the circumferential direction Dc.

EXPLANATION OF REFERENCES

1: compressor
2: combustor
3: turbine
4: generator
5: casing
10: rotor
11: rotor disk
12: upstream rim portion
14: seal arm
15: downstream side rim portion
19: air baffle
21: blade
22: blade main body
23: platform
24: shank
31: vane
32: vane main body
33: inner shroud
34: leg portion
39: compressed air supply path
40: seal ring holder ring (annular member)
41: outer opposing portion
42: inner opposing portion
43: connecting portion
50: seal device
51: upstream seal fin
52: opening
55: guide plate unit
56: guide plate
57: seal fin
58: concave portion
59: main body portion
60: slit portion
62: compressed air discharge path
72: leaf seal
73: labyrinth seal
100: gas turbine
A: compressed air
Ar: axis
C1: first cavity
C2: second cavity
Da: axial direction
Dc: circumferential direction
Dr: radial direction
G1, G2: small gap

What is claimed is:

1. A gas turbine with a turbine comprising:
a rotor configured to rotate around an axis, the rotor having a rotor disk stacked at each of a plurality of stages in an axial direction and a plurality of blades fixed to the respective stages of the rotor disks;
a casing that covers the rotor;
a plurality of vanes fixed to the casing to correspond to the blades at the respective stages of the rotor disks;
an inner shroud on a radially inner side of each of the vanes;
an annular member fixed to a radially inner side of each of the inner shrouds; and
a seal device,
wherein:
the rotor disk has a seal arm that protrudes to a downstream side of the axial direction;
the annular member has an outer opposing portion that is radially outward of the seal arm and radially opposed to the seal arm;
the seal device is configured to seal between the outer opposing portion of the annular member and the seal arm;
the seal device comprises a guide plate unit integrated with a seal fin;
the guide plate unit comprises: (i) a guide plate having a cylindrical shape about the axis;
and (ii) the seal fin connected to an end portion of the guide plate on an upstream side in the axial direction, the seal fin extending in a circumferential direction, and having a tapered shape of which a diameter decreases toward the upstream side in the axial direction; and
wherein the gas turbine comprises:
a first cavity that is defined by being surrounded by the annular member and the inner shroud and extends in the circumferential direction to straddle at least two of the vanes;
a second cavity that is defined by being surrounded by the guide plate, the outer opposing portion and the annular member, and is on a radially inner side of the first cavity, communicates and extends in the circumferential direction, and is open to a radially inner side of the second cavity, the second cavity extending between the guide plate and the annular member;
a compressed air supply path through which compressed air is to be introduced into the first cavity; and
a plurality of compressed air discharge paths positioned at an interval in the circumferential direction and connecting the first cavity to the second cavity; and
wherein:
each of the plurality of compressed air discharge paths extends in a radial direction;
the guide plate extends in the axial direction at a radially inner side of the plurality of compressed air discharge paths so as to face each of the plurality of compressed air discharge paths in the radial direction; and
the seal fin extends obliquely from the guide plate towards the seal arm.

2. The gas turbine according to claim 1,
wherein an angle between the seal fin and the axis is 50° or less.

3. The gas turbine according to claim 1, wherein the seal device further comprises:
a concave portion defined on a radially inner side of the annular member and defining the second cavity which communicates and extends in the circumferential direction between the guide plate unit and the concave portion.

4. The gas turbine according to claim 1,
wherein a surface of the annular member which defines the second cavity, which opposes the seal fin, is parallel to the seal fin.

5. The gas turbine according to claim 1, wherein:
the seal fin is a downstream seal fin; and
the gas turbine further comprises an upstream seal fin that protrudes from an inner circumferential surface of the outer opposing portion of the annular member toward an outer circumferential surface of the seal arm, extends in the circumferential direction, and opposes the downstream seal fin via the second cavity.

6. The gas turbine according to claim 5,
wherein the upstream seal fin protrudes in the radial direction from the inner circumferential surface of the outer opposing portion of the annular member toward the outer circumferential surface of the seal arm.

* * * * *